(12) United States Patent
Kim et al.

(10) Patent No.: US 10,983,347 B2
(45) Date of Patent: Apr. 20, 2021

(54) AUGMENTED REALITY DEVICE

(71) Applicant: LG DISPLAY CO., LTD., Seoul (KR)

(72) Inventors: HanSeok Kim, Paju-si (KR); SungMin Jung, Seoul (KR); Keongjin Lee, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/848,410

(22) Filed: Dec. 20, 2017

(65) Prior Publication Data

US 2018/0180887 A1 Jun. 28, 2018

(30) Foreign Application Priority Data

Dec. 22, 2016 (KR) .......................... 10-2016-0176715

(51) Int. Cl.
*G02B 27/01* (2006.01)
*G02F 1/137* (2006.01)
(Continued)

(52) U.S. Cl.
CPC ......... *G02B 27/0172* (2013.01); *G02B 5/124* (2013.01); *G02B 5/30* (2013.01);
(Continued)

(58) Field of Classification Search
CPC ........ G02B 27/0172; G02B 2027/0123; G02B 5/30; G02B 5/124; G02B 2027/0118; G02B 2027/015; G02B 2027/0127; G02B 2027/0114; G02B 2027/014; G02B 27/017; G06F 3/147; G09G 3/20; G09G 3/3275;
(Continued)

(56) References Cited

U.S. PATENT DOCUMENTS 5,949,583 A * 9/1999 Rallison ................... G02B 6/08 359/631
6,072,632 A 6/2000 Ophey
(Continued)

FOREIGN PATENT DOCUMENTS

CN 1252133 A 5/2000
CN 103261943 A 8/2013
(Continued)

OTHER PUBLICATIONS

Office Action dated Jul. 7, 2020 for Chines Application No. CN201711341088.3, pp. 15.
Yuan, "Theater Design", Tongji University Press, 2012, pp. 16.

*Primary Examiner* — Temesghen Ghebretinsae
*Assistant Examiner* — Ivelisse Martinez Quiles
(74) *Attorney, Agent, or Firm* — Seed IP Law Group LLP (57) ABSTRACT

Disclosed is an AR device which has a thin thickness and a wide FOV and displays an image obtained by mixing a virtual object with the real world. The AR device includes a display unit displaying an augmented image, a reflector reflecting the augmented image displayed by the display unit, and an augmentation unit displaying the augmented image reflected by the reflector along with a real image. The display unit is disposed in an upper boundary of a front viewing angle range of a user, the reflector is disposed at a first angle with respect to the display unit, and the augmentation unit is disposed within the front viewing angle range of the user.

24 Claims, 7 Drawing Sheets

(51) Int. Cl.
 G06T 19/00 (2011.01)
 G09G 3/20 (2006.01)
 G06F 3/147 (2006.01)
 G02B 5/124 (2006.01)
 G02B 5/30 (2006.01)
 G09G 3/3266 (2016.01)
 G09G 3/36 (2006.01)
 G09G 3/3225 (2016.01)
 G09G 3/3275 (2016.01)

(52) U.S. Cl.
 CPC .............. *G02F 1/137* (2013.01); *G06F 3/147* (2013.01); *G06T 19/006* (2013.01); *G09G 3/20* (2013.01); *G02B 2027/015* (2013.01); *G02B 2027/0118* (2013.01); *G02B 2027/0123* (2013.01); *G02B 2027/0127* (2013.01); *G09G 3/3225* (2013.01); *G09G 3/3266* (2013.01); *G09G 3/3275* (2013.01); *G09G 3/3677* (2013.01); *G09G 3/3688* (2013.01); *G09G 2310/08* (2013.01)

(58) Field of Classification Search
 CPC .. G09G 3/3225; G09G 3/3677; G09G 3/3688; G09G 2310/08; G09G 3/3266; G06T 19/006; G02F 1/137
 See application file for complete search history.

(56) References Cited

U.S. PATENT DOCUMENTS

| | | | | |
|---|---|---|---|---|
| 2008/0198459 | A1* | 8/2008 | Fergason | G02B 5/12 359/529 |
| 2009/0073330 | A1* | 3/2009 | Viala | H04L 51/22 349/11 |
| 2012/0050144 | A1* | 3/2012 | Morlock | G06T 19/006 345/8 |
| 2012/0242697 | A1* | 9/2012 | Border | G02B 27/0093 345/633 |
| 2013/0300766 | A1* | 11/2013 | Mukawa | G02B 27/0179 345/633 |
| 2014/0152531 | A1* | 6/2014 | Murray | G06F 1/1632 345/8 |
| 2014/0340424 | A1 | 11/2014 | Ellsworth | |
| 2015/0138235 | A1 | 5/2015 | Cho et al. | |
| 2015/0168730 | A1* | 6/2015 | Ashkenazi | G02B 27/0172 359/631 |
| 2015/0210588 | A1 | 7/2015 | Chang et al. | |
| 2015/0219896 | A1 | 8/2015 | Ouderkirk et al. | |
| 2015/0323796 | A1* | 11/2015 | Yang | G02B 27/0172 345/690 |
| 2016/0033771 | A1 | 2/2016 | Tremblay et al. | |
| 2016/0063327 | A1 | 3/2016 | Yasutake | |
| 2016/0109710 | A1* | 4/2016 | Smith | G02B 27/0172 359/633 |
| 2016/0116742 | A1 | 4/2016 | Wei | |
| 2016/0187650 | A1 | 6/2016 | Mills et al. | |
| 2016/0274364 | A1 | 9/2016 | Carollo et al. | |
| 2016/0341965 | A1 | 11/2016 | Saigo et al. | |
| 2017/0168295 | A1* | 6/2017 | Iwami | G02B 27/017 |
| 2017/0255017 | A1* | 9/2017 | Haseltine | G02B 27/0172 |
| 2018/0054606 | A1* | 2/2018 | Hwang | G06K 9/0063 |
| 2018/0190166 | A1* | 7/2018 | Salmimaa | G09G 3/002 |

FOREIGN PATENT DOCUMENTS

| | | | |
|---|---|---|---|
| CN | 203849501 U | | 9/2014 |
| CN | 104216118 A | | 12/2014 |
| CN | 104781723 A | | 7/2015 |
| CN | 204613517 U | | 9/2015 |
| CN | 105093525 A | | 11/2015 |
| CN | 105117019 A | * | 12/2015 |
| CN | 105899997 A | | 8/2016 |
| CN | 106170729 A | | 11/2016 |
| CN | 106226909 A | | 12/2016 |
| CN | 205826965 U | | 12/2016 |
| JP | 2013238799 A | | 11/2013 |
| JP | 3202424 U | | 2/2016 |
| KR | 20090053316 A | * | 5/2009 |
| KR | 10-2016-0075571 A | | 6/2016 |
| WO | 2012169422 A1 | | 12/2012 |
| WO | 2016160099 A2 | | 10/2016 |
| WO | 2017022998 A1 | | 2/2017 |

* cited by examiner

AUGMENTED REALITY DEVICE

CROSS-REFERENCE TO RELATED APPLICATIONS

This application claims the benefit of the Korean Patent Application No. 10-2016-0176715 filed on Dec. 22, 2016, which is hereby incorporated by reference as if fully set forth herein.

BACKGROUND

Technical Field

The present disclosure relates to an augmented reality (AR) device.

Description of the Related Art

Recently, as society advances to the information-oriented society, the display field of displaying image information has rapidly advanced. Correspondingly, various display devices have been developed and are attracting much attention. Particularly, with the advancement of the information-oriented society, the use of devices which display visual information like reality or display a combination of the visual information and real-world visual information are increasing. The devices may be implemented by applying virtual reality (VR) or AR.

The VR denotes an interface between a user and a computer, in which a specific environment or situation is realized in the computer, and the interface enables the user using the computer to react on an ambient situation or environment. Although users do directly experience an environment difficult to routinely experience, the VR enables the users to feel like acting in the environment. The VR may be applied to fields such as education, high-level programming, remote manipulation, remote satellite surface exploration, exploration material analysis, scientific visualization, etc.

The AR is technology which displays a three-dimensional (3D) virtual object overlapping the real world seen with eyes of a user. Since the AR displays one image obtained by mixing the real world with the virtual world having additional information in real time, the AR is referred to as mixed reality (MR). The AR corresponds to a state where a real environment is mixed with a virtual object, and enables a user to see the real environment, thereby providing additional information and a better sense of reality.

Wearable computers realize the AR at an outdoor place. Examples of an AR system include head-mounted displays (HMDs) having a video type and an optical type. The HMDs are glasses-type monitor devices which are worn in a glasses type or a helmet type and form a focal point at a distance close to eyes of a user. In this manner, a computer screen device worn on a head displays in real time computer graphics or letters overlapping the real environment seen with eyes of a user, thereby enabling the AR.

In the VR, a user can see only closed virtual reality. Also, in devices for realizing the VR, a phase for expressing virtual reality should be formed inside a device, and thus, a size of a device increases depending on a focal distance of an internal lens. In the AR, a field of view (FOV) is narrow. Also, in a case where an AR device is implemented to have a small size, the AR device can be implemented as only a projection type.

BRIEF SUMMARY

Accordingly, the present disclosure is directed to provide an AR device that substantially obviates one or more problems due to limitations and disadvantages of the related art.

An aspect of the present disclosure is directed to provide an AR device which has a thin thickness and a wide FOV and displays an image obtained by mixing a virtual object with the real world.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided an AR device including a display unit that displays an augmented image, a reflector that reflects the augmented image displayed by the display unit, and an augmentation unit that displays the augmented image reflected by the reflector along with a real image. The display unit is disposed in an upper boundary of a front viewing angle range of a user, when the AR device is worn by the user, a lower corner of the reflector is disposed adjacent to a front surface of the user, and the augmentation unit is disposed within the front viewing angle range of the user.

It is to be understood that both the foregoing general description and the following detailed description of the present disclosure are exemplary and explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where "comprise," "have," and "include" described in the present specification are used, another part may be added unless "only~" is used. The terms of a singular form may include plural forms unless referred to the contrary.

In construing an element, the element is construed as including an error range although there is no explicit description.

In describing a position relationship, for example, when a position relation between two parts is described as "on~," "over~," "under~," and "next~," one or more other parts may be disposed between the two parts unless "just" or "direct" is used.

In describing a time relationship, for example, when the temporal order is described as "after~," "subsequent~," "next~," and "before~," a case which is not continuous may be included unless "just" or "direct" is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

An X axis direction, a Y axis direction, and a Z axis direction should not be construed as only a geometric relationship where a relationship therebetween is vertical, and may denote having a broader directionality within a scope where elements of the present disclosure operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, exemplary embodiments of the present disclosure will be described in detail with reference to the accompanying drawings.

Figure 1:
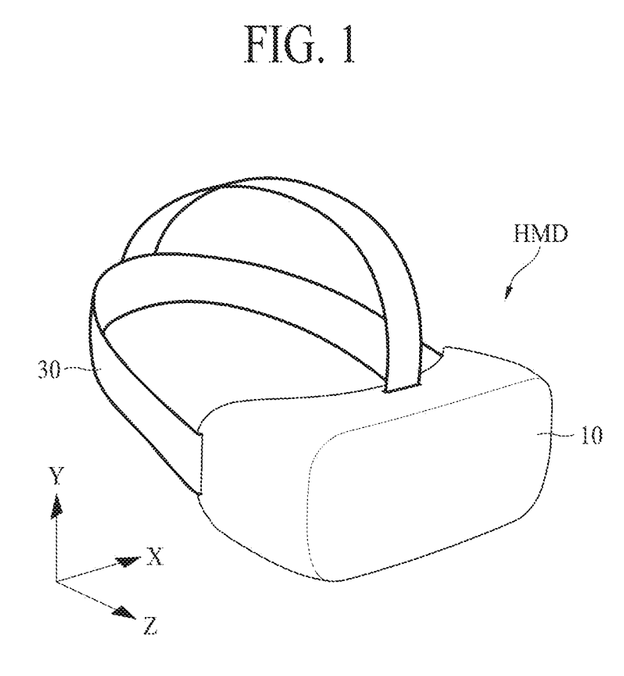
FIGS. 1 and 2 are exemplary diagrams illustrating an example where an AR device according to an embodiment of the present disclosure is implemented as an HMD.
Figure 2:
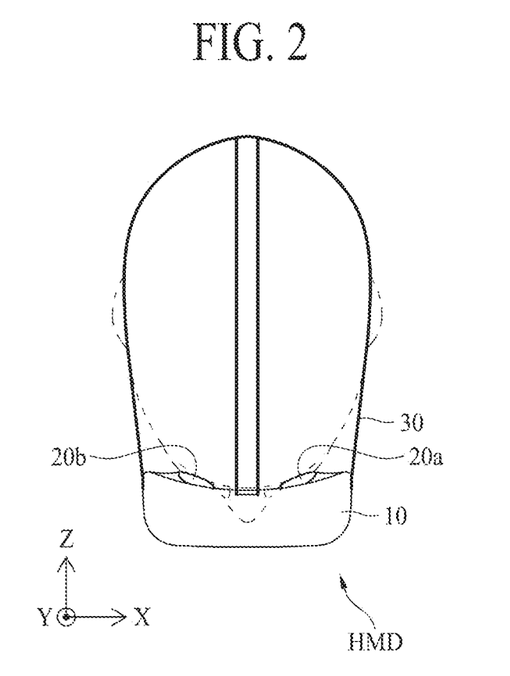
Figure 3:
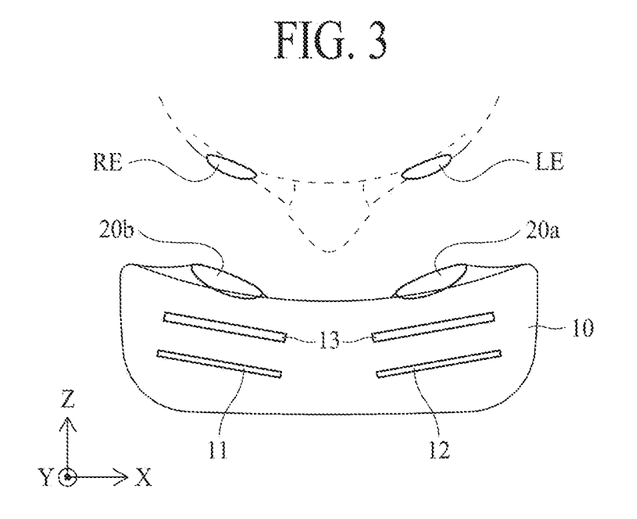
FIG. 3 is an exemplary diagram illustrating an embodiment of a display unit of FIGS. 1 and 2.

FIGS. 1 and 2 are exemplary diagrams illustrating an example where an AR device according to an embodiment of the present disclosure is implemented as an HMD. FIG. 3 is an exemplary diagram illustrating an embodiment of a display unit of FIGS. 1 and 2. The AR device according to an embodiment of the present disclosure is generally implemented an HMD, and thus, its basic structure will be first described.

Referring to FIGS. 1 to 3, an HMD according to an embodiment of the present disclosure may include a display unit 10, a left-eye lens 20a, a right-eye lens 20b, and a head-mounted band 30.

The display unit 10 may display an augmented image. As used herein, an augmented image refers to computer-generated or extracted information that is associated with a real-world environment and that may be displayed to a user. Such an augmented image is different herein from a real image, in that the term real image is used herein to refer to an image of the real-world environment that may be displayed to or otherwise viewed by a user. An augmented reality device may provide real images and augmented images in an overlapping manner to provide an augmented reality environment viewable by the user.

The display unit 10 may provide an image, displayed by the display unit 10, to the left-eye lens 20a and the right-eye image 20b. The display unit 10, as in FIG. 3, may include a left-eye display unit 11 disposed in front of the left-eye lens 20a and a right-eye display unit 12 disposed in front of the right-eye lens 20b.

The left-eye display unit 11 and the right-eye display unit 12 may display the same image, and in this case, a user may watch a two-dimensional (2D) image. Alternatively, the left-eye display unit 11 may display a left-eye image, and the right-eye display unit 12 may display a right-eye image. In this case, the user may watch a stereoscopic image.

The left-eye display unit 11 and the right-eye display unit 12 may each be implemented with one of a liquid crystal display (LCD), an organic light emitting display, a field emission display, an electrophoresis display, etc.

The display unit 10, as in FIG. 3, may further include a lens array 13 disposed between the left-eye display unit 11 and the left-eye lens 20a and a lens array 13 disposed between the right-eye display unit 12 and the right-eye lens 20b. The lens array 13 may be a micro lens array. In one or more embodiments, the lens array 13 may be replaced by a pin hole array. An image displayed by the left-eye display unit 11 or the right-eye display unit 12 may be magnified by the lens array 13 and may be seen to the user.

In use, a left eye of the user may be located at or near the left-eye lens 20a, and a right eye of the user may be located at or near the right-eye lens 20b. That is, each of the left-eye lens 20a and the right-eye lens 20b may correspond to an eyepiece lens when the HMD is worn by a user.

The head-mounted band 30 is fixed to the display unit 10. It is illustrated that the head-mounted band 30 is provided to surround a top and both sides of a head of a user, but the present embodiments are not limited thereto. The head-mounted band 30 is for fixing the HMD to a head of a user and may be implemented as a glasses frame type or a helmet type.

Figure 4:
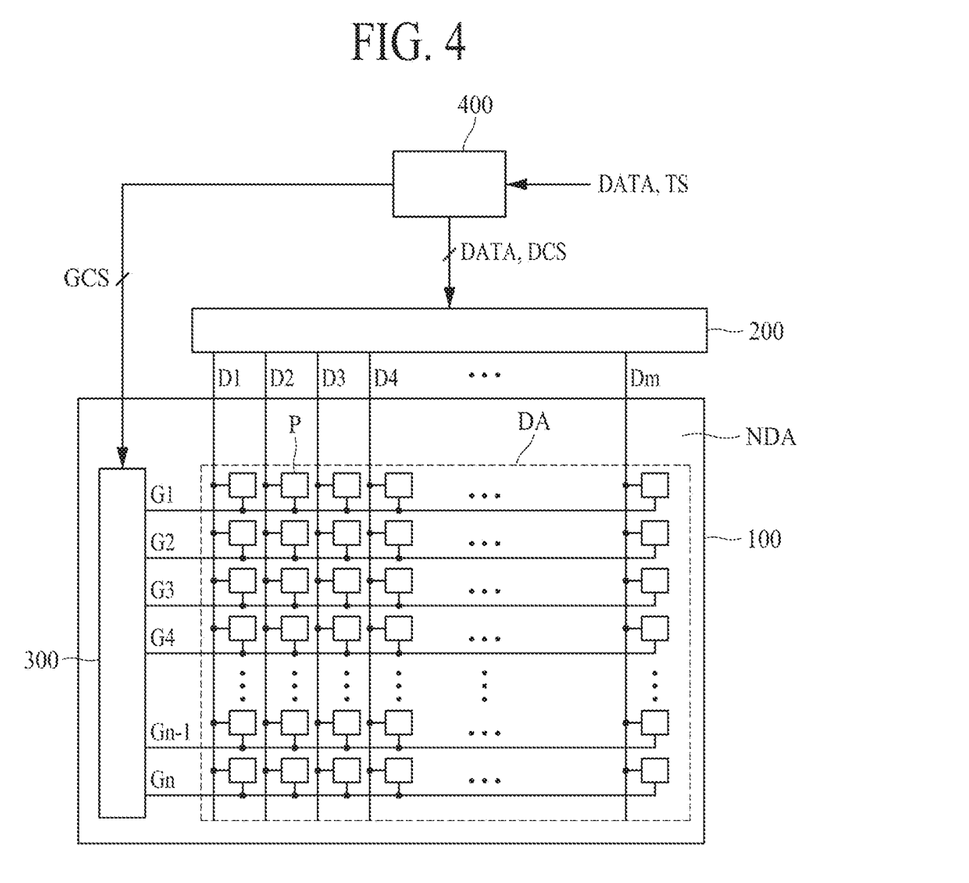
FIG. 4 is a block diagram illustrating an embodiment of the display unit of FIG. 3.

FIG. 4 is a block diagram illustrating an embodiment of the display unit 10 of FIG. 3.

The display unit 10 may be implemented with any display device where data voltages are respectively supplied to a plurality of pixels through a line scanning operation of supplying gate signals to a plurality of gate lines G1 to Gn. The display unit 10 may be implemented with one of an LCD, an organic light emitting display, a field emission display, an electrophoresis display, etc., but is not limited thereto. In description below, the display unit 10 may include a display panel 100, a data driver 200, a gate driver 300, and a timing controller 400.

The display panel 100 may be divided into a display area DA and a non-display area NDA. The display area DA may be an area where a plurality of pixels P are provided to display an image. The non-display area NDA may be an area which is provided near the display area DA, and may be an area on which an image is not displayed.

The display panel 100 may include an upper substrate and a lower substrate. The display area DA including a plurality of data lines D1 to Dm (where m is an integer equal to or more than two), a plurality of gate lines G1 to Gn (where n is an integer equal to or more than two), and the pixels P may be provided on the lower substrate. The data lines D1 to Dm may be provided to intersect the gate lines G1 to Gn. Each of the pixels P may be connected to one corresponding data line of the data lines D1 to Dm and one corresponding gate lines of the gate lines G1 to Gn.

Each of the pixels P may include an organic light emitting diode (OLED), a driving transistor, at least one switching transistor, and a capacitor. The switching transistor may supply a data voltage of a data line to a gate electrode of the driving transistor in response to a gate signal of a gate line. The driving transistor may control a driving current flowing from a high level voltage line to the OLED, based on the data voltage supplied to the gate electrode. The OLED may be provided between the driving transistor and a low level voltage line to emit light having certain brightness with the driving current. The capacitor may be connected to the gate electrode of the driving transistor at one end of the capacitor, for holding a constant voltage at the gate electrode of the driving transistor. The other end of the capacitor may be connected to the high level voltage line or a source electrode of the driving transistor and may be modified depending on a design of each pixel.

The gate driver 300 may be connected to the gate lines G1 to Gn to supply the gate signals to the gate lines G1 to Gn. In detail, the gate driver 300 may generate the gate signals according to a gate control signal GCS and may supply the gate signals to the gate lines G1 to Gn.

The gate driver 300 may be provided in the non-display area NDA in a gate driver in panel (GIP) type. In FIG. 3, it is illustrated that the gate driver 300 is provided outside one side of the display area DA, but the present embodiment is not limited thereto. For example, the gate driver 300 may be provided outside both sides of the display area DA.

Alternatively, the gate driver 300 may include a plurality of gate drive integrated circuits (ICs), and the gate drive ICs may be mounted on a plurality of gate flexible films. The gate flexible films may each be a tape carrier package or a chip on film. The gate flexible films may be attached on the non-display area NDA of the display panel 100 in a tape automated bonding (TAB) type by using an anisotropic conductive film, and thus, the gate drive ICs may be connected to the gate lines G1 to Gn.

The data driver 200 may be connected to the data lines D1 to Dm. The data driver 200 may receive image data DATA and a data control signal DCS from the timing controller 400. The data driver 200 may convert the image data DATA into analog data voltages according to the data control signal DCS. The data driver 200 may supply the analog data voltages to the data lines D1 to Dm.

The data driver 200 may include at least one source drive IC. Each of the source drive ICs may be manufactured as a driving chip. The source drive ICs may be respectively mounted on a plurality of source flexible films. Each of the source flexible films may be implemented as a tape carrier package or a chip on film and may be bent or curved. The source flexible films may be attached on the non-display area NDA of the display panel 100 in the TAB type by using an anisotropic conductive film, and thus, the source drive ICs may be connected to the data lines D1 to Dm.

Moreover, the source flexible films may be attached on a source circuit board. The source circuit board may be a flexible printed circuit board (FPCB) capable of being bent or curved.

The timing controller 400 may receive digital video data DATA and timing signals TS from an external system board. The timing signals TS may include a vertical sync signal, a horizontal sync signal, a data enable signal, etc.

The timing controller 400 may generate a gate timing control signal GCS for controlling an operation timing of the gate driver 300 and a data timing control signal DCS for controlling an operation timing of the data driver 200, based on the timing signals TS. The timing controller 400 may supply the gate timing control signal GCS to the gate driver 300. The timing controller 400 may supply the digital video data DATA and the data timing control signal DCS to the data driver 200.

The timing controller 400 may be mounted on a control printed circuit board (PCB). The source circuit board may be connected to the control PCB through a flexible flat cable (FFC) or a flexible printed circuit (FPC). The control PCB may be an FPCB capable of being bent or curved.

Figure 5:
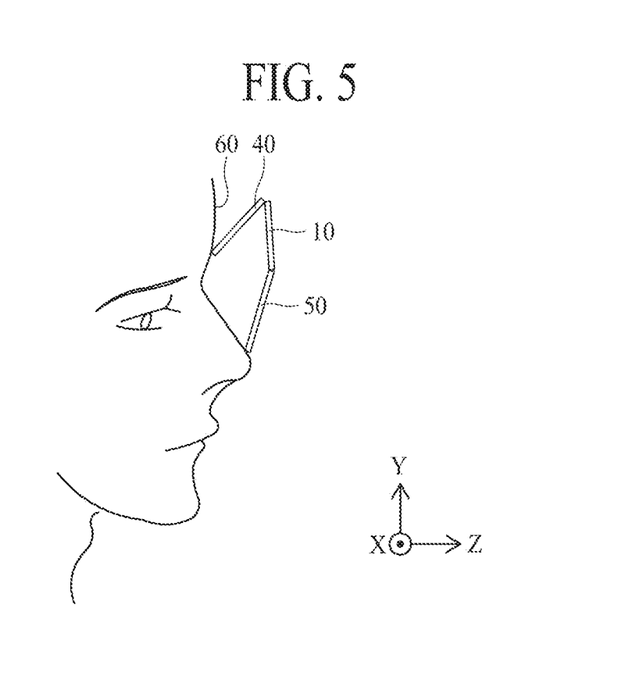
FIG. 5 is a side view illustrating an AR device according to an embodiment of the present disclosure.

FIG. 5 is a side view illustrating an AR device according to an embodiment of the present disclosure. The AR device according to an embodiment of the present disclosure may include a display unit 10 which displays an augmented image AI, a reflector 40 which reflects the augmented image AI displayed by the display unit 10, and an augmentation unit 50 which displays the augmented image AI reflected by the reflector 40 along with a real image RI.

The display unit 10 may be disposed on an upper boundary surface of a front viewing angle range of a user 60. The front viewing angle range of the user 60 may denote sight which enables the user 60 to see without being obstructed in a case where the user 60 wears the AR device according to an embodiment of the present disclosure.

Figure 7:
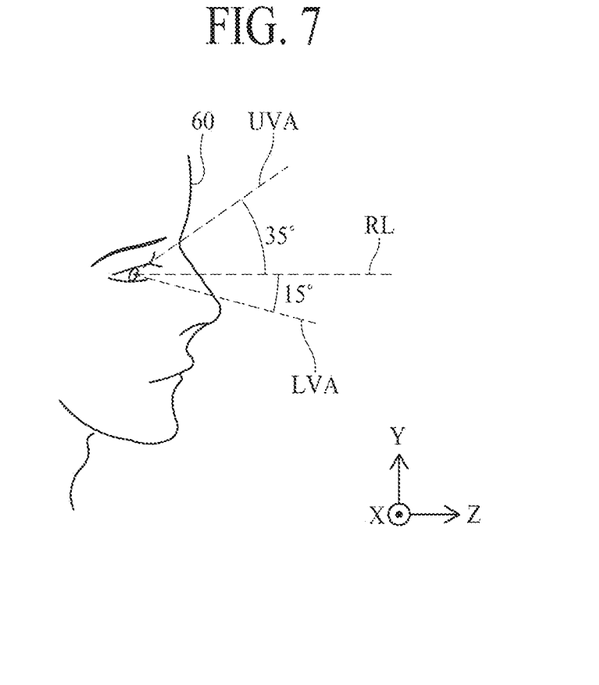
FIG. 7 is a side view illustrating a viewing angle range of a user when an AR device according to an embodiment of the present disclosure is worn.
Figure 8:
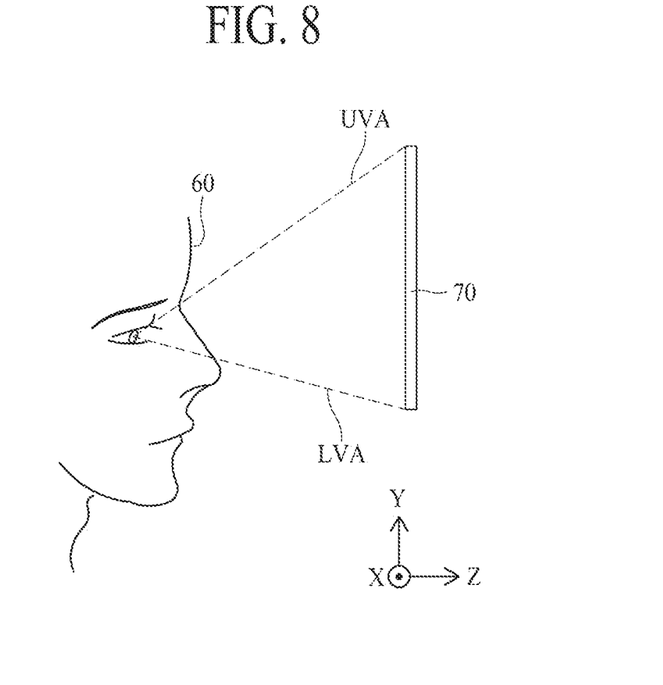
FIG. 8 is a side view illustrating sight of a user with respect to a viewing angle range of the user when an AR device according to an embodiment of the present disclosure is worn.

FIG. 7 is a side view illustrating a viewing angle range of a user 60 when an AR device according to an embodiment of the present disclosure is worn. As in FIG. 7, a front viewing angle range may be a range between 35 degrees at an upper side and −15 degrees at a lower side with respect to a reference line RL which extends in a Z-axis direction (a horizontal direction) from eyes of the user 60. That is, the front viewing angle range may be a range of viewing angles that includes all viewing angles between 35 degrees and −15 degrees with respect to the reference line RL. A viewing angle corresponding to an angle formed at an upper side with respect to the reference line RL may be defined as an upper viewing angle UVA, and a viewing angle corresponding to an angle formed at a lower side with respect to the reference line RL may be defined as a lower viewing angle LVA. FIG. 8 is a side view illustrating a user sight 70 with respect to a viewing angle range of a user 60 when an AR device according to an embodiment of the present disclosure is worn. The user sight 70 may be formed between an upper viewing angle UVA and a lower viewing angle LVA. An object outside a user sight 70 range is seen when the user 60 moves a head upward and downward.

The display unit 10 may display an augmented image AI. The augmented image AI may be recognized by the user 60 in a state of overlapping a real image RI. The augmented image AI and the real image RI may be simultaneously recognized by the user 60 through the same path via the augmentation unit 50 so as to prevent the augmented image AI from being recognized separately from objects of the real image RI.

For example, in a case where the user 60 observes a natural environment, the user 60 may recognize the natural environment as the real image RI. At this time, the augmented image AI may display additional information about the natural environment. In detail, the augmented image AI may display information about animals and plants in the natural environment, or may display notification of ambient geography or a risk situation. The augmented image AI may be recognized by the user 60 in a state of overlapping the real image RI which is the natural environment.

As another example, when the user 60 has gone to market, the user 60 may recognize exhibited goods as the real image RI. At this time, the augmented image AI may display additional information about the goods. In detail, the augmented image AI may display basic information about a product to which corresponding goods belong, a review of the goods or evaluation by consumers, a manufactured history of the goods, and the freshness or shelf life of an agricultural product. The augmented image AI may be added next to the goods in a speech bubble type and may be recognized by the user 60.

In more detail, the display unit 10 according to an embodiment of the present disclosure may be a plastic OLED (P-OLED).

The P-OLED may use a plastic substrate, which is bendable, as a lower substrate which is a thin film transistor (TFT) substrate. The plastic substrate may be manufactured as a polyimide substrate which replaces a conventional glass substrate. In the plastic substrate, a TFT may be manufactured by using low temperature poly silicon (LTPS). In the P-OLED, a flexible encapsulation layer may be deposited as an encapsulation layer so as to protect an OLED. Also, glass may be removed, and a film may be attached on the P-OLED.

The P-OLED may have flexibility, and thus, a shape of the P-OLED may be modified based on the user 60 or a shape of the AR device. Also, the P-OLED may be manufactured to have a thin thickness in comparison with other display devices.

In the AR device according to an embodiment of the present disclosure, since the P-OLED is applied as the display unit 10, a thickness is reduced. Also, since the P-OLED is applied as the display unit 10, a shape of the AR device can be freely modified.

The display unit 10 of the AR device according to an embodiment of the present disclosure may supply the entire augmented image AI to the reflector 40 without directly displaying the augmented image AI at a viewing angle of the user 60.

In a case where the display unit 10 directly supplies the augmented image AI to the viewing angle of the user 60, the display unit 10 should be provided in front of the viewing angle of the user 60. In this case, a certain interval between the display unit 10 and the user 60 is physically needed for adjusting a focal distance between the display unit 10 and the user 60. Accordingly, since a gap should be provided in the AR device in order for the display unit 10 to be far away from eyes of a user, a thickness of the AR device increases.

On the other hand, in a case where the display unit 10 supplies the augmented image AI to the reflector 40 as in an embodiment of the present disclosure, the augmented image AI may travel from the display unit 10 to the reflector 40, travel from the reflector 40 to the augmentation unit 50, and travel from the augmentation unit 50 to the user 60. In this case, a distance between the display unit 10 and the user 60 is reduced by a distance between the display unit 10 and the reflector 40. Accordingly, a thickness of the AR device is reduced.

Figure 6:
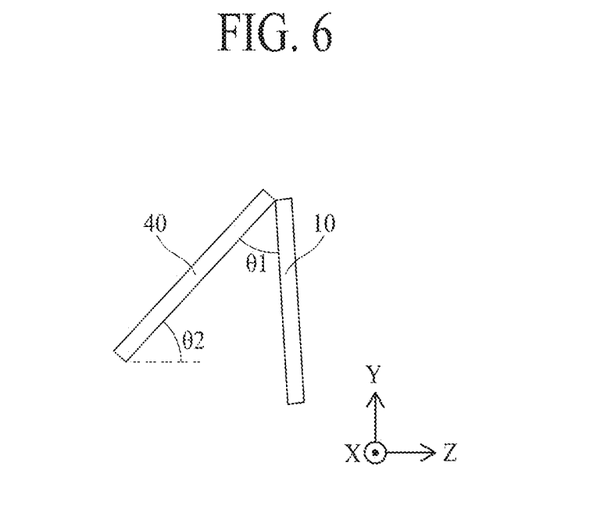
FIG. 6 is a side view illustrating a display unit and a reflector of an AR device according to an embodiment of the present disclosure.

FIG. 6 is a side view illustrating a display unit 10 and a reflector 40 of an AR device according to an embodiment of the present disclosure.

The reflector 40 of the AR device according to an embodiment of the present disclosure may be disposed at a first angle θ1 with respect to the display unit 10. The first angle θ1 may denote an angle of the reflector 40 with respect to the display unit 10 when seen from a side. A reflective surface of the reflector 40 may face a down direction. The reflector 40 may reflect an augmented image AR, provided by the display unit 10, in the down direction. The reflector 40 may reflect the augmented image AI at a light reflectance of 95% to 99% by using the reflective surface. The reflective surface of the reflector 40 may include a mirror or metal which is high in light reflectance. The augmented image AI reflected by the reflector 40 may be incident on the augmentation unit 50.

A lower corner of the reflector 40 of the AR device according to an embodiment of the present disclosure may be disposed adjacent to a front surface of a user 60. The lower corner of the reflector 40 may be disposed in a portion where sight of the user 60 is located. For example, the lower corner of the reflector 40 may be disposed adjacent to a portion on a portion which the sight of the user 60 reaches. In this case, the lower corner of the reflector 40 may be disposed on a line corresponding to an upper viewing angle UVA of the user 60.

For example, in a case where the AR device according to an embodiment of the present disclosure is a glasses type display or an HMD, the lower corner of the reflector 40 may be disposed adjacent to a portion on a forehead or eyes of the user 60. Therefore, the entire augmented image AI provided from the display unit 10 may be reflected by the reflector 40.

The augmented image AI reflected by the reflector 40 may overlap a real image RI in the augmentation unit 50 and may be recognized by the user 60. Accordingly, an augmented image which is not out of the real world or has no sense of difference with the real world may be realized.

An upper corner of the reflector 40 of the AR device according to an embodiment of the present disclosure may be disposed adjacent to an upper corner of the display unit 10. To this end, an adhesive may be provided in the upper corner of the reflector 40, and moreover, an adhesive may be provided in the upper corner of the display unit 10. In this case, the upper corner of the reflector 40 may be attached on the upper corner of the display unit 10 by using an adhesive. Alternatively, the upper corner of the reflector 40 may be attached on the upper corner of the display unit 10 by applying, instead of the adhesive, a fastening tool such as a bolt and a nut to the upper corner. Alternatively, a case which supports the reflector 40 and a case which supports the display unit 10 may be designed as a customized type, and in a case of inserting the reflector 40 into the case, it may be designed that the upper corner of the reflector 40 contacts the upper corner of the display unit 10.

In a case where the upper corner of the reflector 40 is spaced apart from the upper corner of the display unit 10, light leakage where light emitted from the display unit 10 passes over the upper corner of the reflector 40 and is leaked can occur. In this case, like a border of the augmented image AI being cut, the augmented image AI is recognized by the user 60. When the upper corner of the reflector 40 is disposed adjacent to the upper corner of the display unit 10, light leakage is prevented, and a problem where an end portion of the augmented image AI recognized by the user 60 is cut is solved.

The reflector 40 according to an embodiment of the present disclosure may be disposed at a second angle θ2 with respect to a horizontal axis, which may be parallel with a surface of the earth. The augmented image AI provided from the reflector 40 may be incident on sight of the user 60 via the augmentation unit 50. In this case, the augmented image AI provided from the augmentation unit 50 may be provided in parallel with the surface of the earth. The augmented image AI provided in parallel with the surface of the earth is not affected by a curvature of the augmentation unit 50, and thus, distortion does not occur in sight of the user 60. Therefore, the reflector 40 may be provided at the second angle θ2 with respect to the surface of the earth, and thus, the augmented image AI provided from the augmentation unit 50 may be disposed in parallel with respect to the surface of the earth. Accordingly, a problem where the augmented image AI is distorted in sight of the user 60 is prevented.

The augmentation unit 50 may be disposed within a front viewing angle range of the user 60. The augmentation unit 50 may be a planar type or a curve type. When the augmentation unit 50 is the curve type, the augmentation unit 50 may be a spherical type or an aspherical type.

Figure 9:
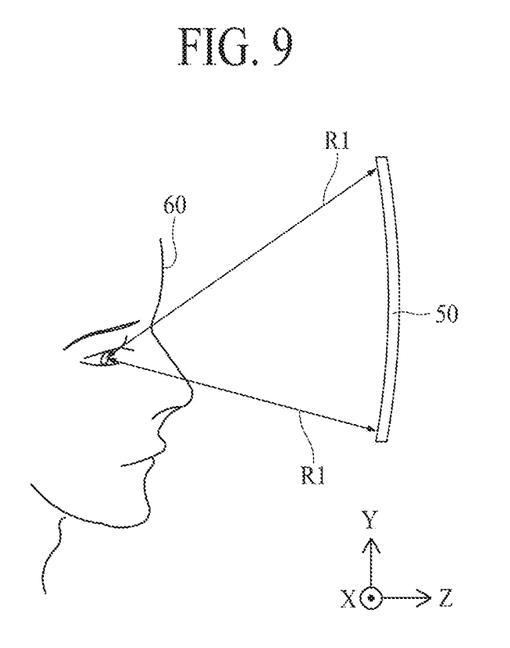
FIG. 9 is a side view illustrating a distance to eyes of a user with respect to positons of an augmentation unit according to an embodiment of the present disclosure.

FIG. 9 is a side view illustrating a distance to eyes of a user 60 with respect to positons of an augmentation unit 50 according to an embodiment of the present disclosure.

A distance between the eyes of the user 60 and the augmentation unit 50 according to an embodiment of the present disclosure may be constant. The augmentation unit 50 according to an embodiment of the present disclosure may be provided to have a curve surface, and thus, a distance from the eyes of the user 60 may be a first length R1 and may be constant within a viewing angle range of the user 60. When the distance from the eyes of the user 60 is constant from an upper viewing angle UVA to a lower viewing angle LVA, an augmented image AI and a real image RI which are incident on the user 60 from the augmentation unit 50 may all travel by the same distance. Therefore, there is no difference between a traveling distance of the augmented image AI and a traveling distance of the real image RI within a range from the upper viewing angle UVA to the lower viewing angle LVA, and thus, twisting or distortion of a screen caused by a difference between traveling distances by areas does not occur.

Figure 10:
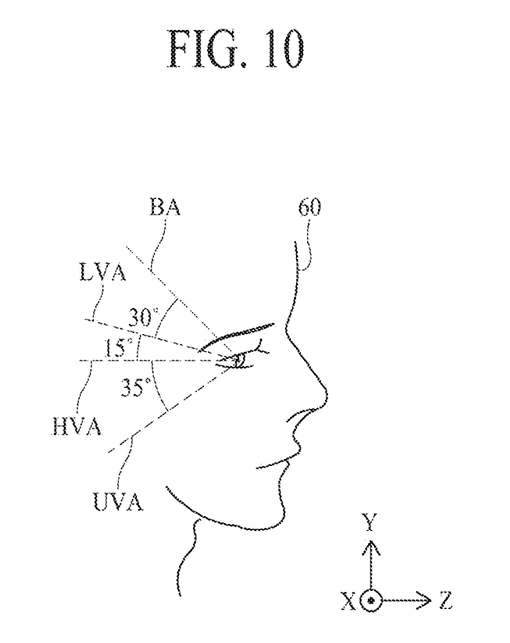
FIG. 10 is a side view illustrating an angle of light affecting the inside of eyes and brain with respect to an incident path for each of viewing angles of a user according to an embodiment of the present disclosure.

FIG. 10 is a side view illustrating an angle of light affecting the inside of eyes and brain with respect to an incident path for each of viewing angles of a user according to an embodiment of the present disclosure.

External incident light may extend to the inside of eyes or brain of a user in a rectilinear type. Therefore, light incident at an angle of an upper viewing angle UVA may travel in a down direction inside the eyes, and light incident at an angle of a lower viewing angle LVA may travel in an up direction inside the eyes. In FIG. 10, it is illustrated that as illustrated in FIG. 7, the upper viewing angle UVA is 35 degrees in an up direction, and the lower viewing angle LVA is 15 degrees in a down direction. Also, light incident in a direction corresponding to a horizontal viewing angle HVA may travel in a horizontal direction even inside the eyes.

Light which travels inside the eyes reaches optic nerve and stimulates the optic nerve to transfer visual information to the brain. An organ of brain relevant to vision is midbrain, and a reference line which enables a stimulation applied to the optic nerve to be felt in the brain is up to a cranial nerves area BA. The cranial nerves area BA has an angle which is 30 degrees higher than an extension line of the lower viewing angle LVA. Only up to light which travels at an angle lower than that of the cranial nerves area BA can be recognized. Accordingly, it is required to control light so as to be incident within the angle range.

Figure 11:
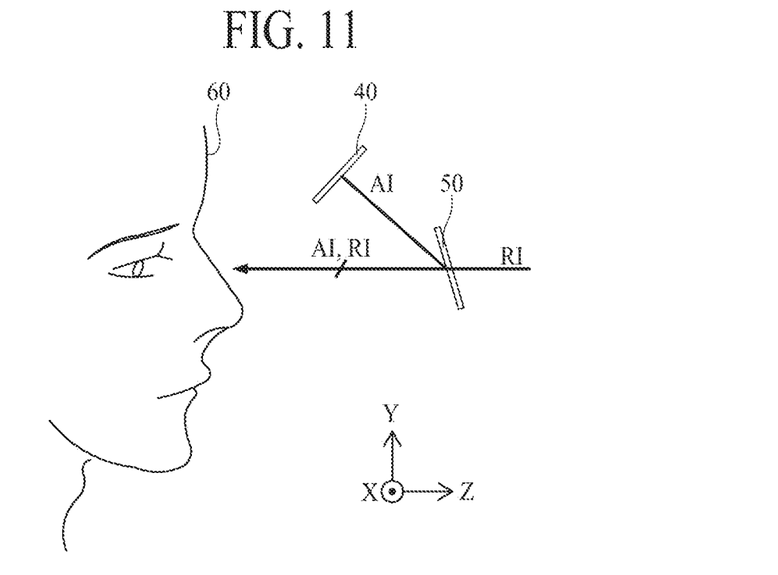
FIG. 11 is a side view illustrating a traveling path of each of an augmented image and a real image provided by an AR device according to an embodiment of the present disclosure.

FIG. 11 is a side view illustrating a traveling path of each of an augmented image AI and a real image RI provided by an AR device according to an embodiment of the present disclosure.

The augmentation unit 50 may have a transmissive axis and a reflective axis. The transmissive axis and the reflective axis of the augmentation unit 50 may be vertical to each other. The augmentation unit 50 may transmit light which is polarized in a direction matching the transmissive axis. The augmentation unit 50 may reflect light which is polarized in a direction matching the reflective axis. That is, the augmentation unit 50 may reflect light which is polarized in a direction vertical to the transmissive axis. The augmentation unit 50 may be implemented with a polarized half-mirror or an advanced polarizing film (APF) which is a reflective polarizing film.

The augmentation unit 50 according to an embodiment of the present disclosure may be a polarized half-mirror which transmits the real image RI and reflects the augmented image AI. The polarized half-mirror may selectively transmit or reflect light according to an incident direction or a polarizing direction of the light. Since the polarized half-mirror transmits some of incident light and reflects the other light, the polarized half-mirror may have a transmittance of about 50% and a reflectance of about 50%. When the polarized half-mirror is used as the augmentation unit 50, the augmentation unit 50 may reflect the augmented image AI at the same time with transmitting the real image RI. Therefore, an image where the real image RI overlaps the augmented image AI may be provided to the user 60.

The augmentation unit 50 may be implemented with a reflective polarizing film. Examples of the reflective polarizing film may include an APF and a dual brightness enhancement film (DBEF) manufactured by Minnesota Mining and Manufacturing. According to the experiment, when the DBEF is applied as the augmentation unit 50, the augmentation unit 50 may have a transmittance of 92% and a reflectance of 95%. Accordingly, in the augmentation unit 50, a sum of the transmittance and the reflectance is more than 100%, and thus, a luminance of a stereoscopic image is considerably enhanced.

The augmentation unit 50 of the AR device according to an embodiment of the present disclosure may allow the real image RI and the augmented image AI to travel in a first direction which is a direction toward a front surface of the user 60. The first direction may be a direction parallel to a front surface of each of eyes of the user 60. In this manner, the augmentation unit 50 may allow the real image RI and the augmented image AI to travel in a direction parallel to the front surface of each of eyes of the user 60, and thus, the real image RI may overlap the augmented image AI without distortion.

The augmentation unit 50 of the AR device according to an embodiment of the present disclosure may allow the real image RI and the augmented image AI to travel within a front viewing angle range of the user 60. When a portion of each of the real image RI and the augmented image AI deviates from the front viewing angle range of the user 60, the user 60 recognizes an edge-cut image. Accordingly, the augmentation unit 50 may allow the real image RI and the augmented image AI to travel within a front viewing angle range of the user 60, thereby enabling the user 60 to watch a normal image of which any portion is not cut.

Moreover, the augmentation unit 50 of the AR device according to an embodiment of the present disclosure may provide the real image RI and the augmented image AI so as to correspond to an upper viewing angle UVA and a lower viewing angle LVA. The upper viewing angle UVA and the lower viewing angle LVA may each be an angle which enables the user 60 to recognize an image at a widest viewing angle. Therefore, in a case of providing the real image RI and the augmented image AI so as to correspond to the upper viewing angle UVA and the lower viewing angle LVA, the user 60 can recognize an image corresponding to a widest range within a viewing angle range.

Figure 12:
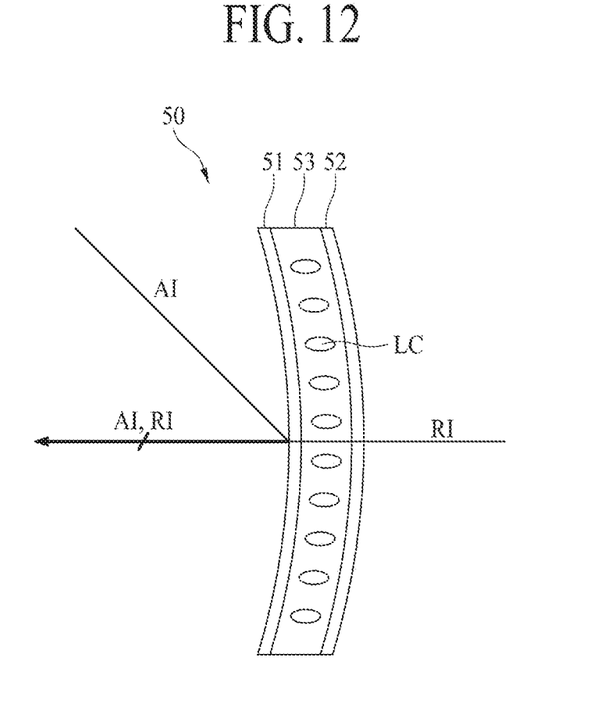
FIG. 12 is a side view illustrating a traveling path of each of an augmented image and a real image in a case where an AR device according to an embodiment of the present disclosure transmits the real image.
Figure 13:
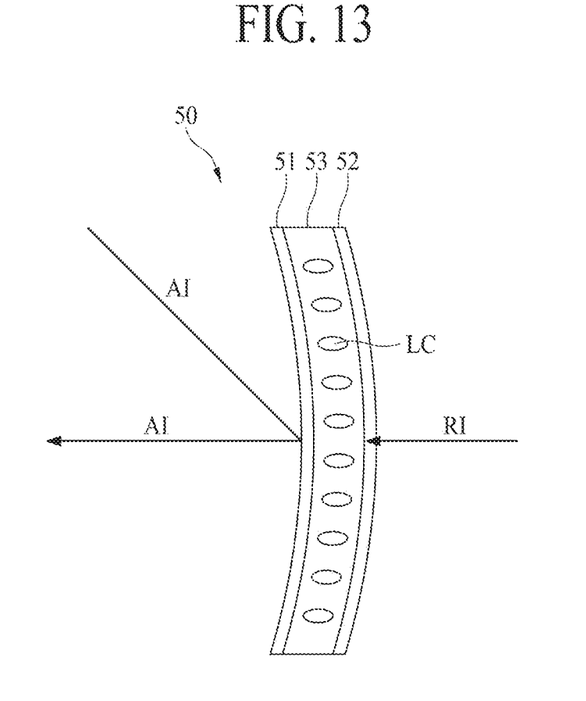
FIG. 13 is a side view illustrating a traveling path of each of an augmented image and a real image in a case where an AR device according to an embodiment of the present disclosure blocks the real image.

FIG. 12 is a side view illustrating a traveling path of each of an augmented image AI and a real image RI in a case where an AR device according to an embodiment of the present disclosure transmits the real image RI. FIG. 13 is a side view illustrating a traveling path of each of the augmented image AI and the real image RI in a case where the AR device according to an embodiment of the present disclosure blocks the real image RI.

An augmentation unit 50 according to an embodiment of the present disclosure may include a reflective polarizing film 51 and an external polarizing film 52. Also, the augmentation unit 50 according to an embodiment of the present disclosure may further include a transmittance controller 53 which controls a transmittance of the real image RI.

The reflective polarizing film 51 may reflect the augmented image AI and may transmit the real image RI. The external polarizing film 52 may polarize the real image RI so as to match a transmissive axis of the reflective polarizing film 51.

The transmittance controller 53 may control a light transmittance of the real image RI. The transmittance controller 53 may transmit or block the real image RI, or may transmit only a portion of the real image RI.

Depending on the case, as in a VR device, the AR device may block the real image RI provided in the real world and may transfer only the augmented image AI to the user 60. Also, when a luminance of the real image RI is excessively high, the augmented image AI is not normally recognized and causes dazzling of the user 60.

As described above, in a case of controlling a transmittance of the real image RI by using the transmittance controller 53, the transmittance controller 53 may lower a transmittance of the real image RI when emphasis of the augmented image AI is needed, thereby enhancing a visibility of the augmented image AI. Also, when the real image RI is completely blocked, a VR/AR switching device capable of operating in an AR mode and a VR mode may be implemented.

The transmittance controller 53 according to an embodiment of the present disclosure may include a liquid crystal cell LC which controls a light transmittance and a voltage supply unit which supplies a driving voltage to the liquid crystal cell LC.

The liquid crystal cell LC may control a transmittance of incident light. The liquid crystal cell LC may block or transmit light, based on alignment of liquid crystal. For example, a light transmittance of the liquid crystal cell LC is the maximum when a direction of the incident light is parallel to a long axis of the liquid crystal. Also, a light transmittance of the liquid crystal cell LC is the minimum when the direction of the incident light is vertical to the long axis of the liquid crystal.

The voltage supply unit may supply a driving voltage for changing an alignment direction of the liquid crystal. The driving voltage may be supplied to electrodes respectively disposed both end boundaries of the liquid crystal cell LC. When the driving voltage is supplied, an electric field may be applied to the liquid crystal cell LC, and thus, the alignment direction of the liquid crystal may be changed. For example, when the driving voltage is not supplied, the long axis of the liquid crystal may be aligned in parallel to a direction of light incident on the liquid crystal cell LC. In this case, as the driving voltage is supplied, the long axis of the liquid crystal may be aligned obliquely with respect to the direction of the light incident on the liquid crystal cell LC, and when the driving voltage is supplied at a maximum level, the long axis may be aligned vertical to the direction of the light incident.

In a transmittance control method using the liquid crystal cell LC and the voltage supply unit, when the driving voltage is not supplied, a transmittance of the real image RI is the highest, and when the driving voltage is supplied at a maximum level, a transmittance of the real image RI is the lowest. Accordingly, a transmittance of the real image RI may be controlled based on a level of the driving voltage.

As described above, since a light transmittance of the real image RI is controlled by using the liquid crystal cell LC and the voltage supply unit, a visibility of the augmented image AI is enhanced, or a detailed method for switching between the AR mode and the VR mode is provided.

In the AR device according to the embodiments of the present disclosure, an augmented image provided from the display unit may be reflected by the reflector and may be mixed with a real image by the augmentation unit, and an image obtained by mixing the augmented image with the real image is in sight of a user. Therefore, in the AR device according to the embodiments of the present disclosure, a distance between the display unit and sight of the user is reduced in comparison with a case where the display unit directly provides an augmented image to within sight of the user, and thus, a thickness is thinned.

Moreover, in the AR device according to the embodiments of the present disclosure, an image where an augmented image overlaps a real image may be provided to a viewing angle corresponding to an upper viewing angle and a lower viewing angle which are boundaries of a viewing angle of a user. Accordingly, the AR device according to the embodiments of the present disclosure has a wide FOV.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An augmented reality (AR) device, comprising:
a display device that displays an augmented image;
a reflector having a reflective surface that faces in a downward direction, the reflector reflects the augmented image displayed by the display device in the downward direction; and
an augmentation optical element that displays the augmented image reflected by the reflector along with a real image,
wherein
the display device is disposed in an upper boundary of a front viewing angle range of a user, when the AR device is worn by the user,
an upper edge of the reflector extends outwardly away from the user, the upper edge of the reflector disposed adjacent to an upper edge of the display device,
a lower edge of the reflector extends toward the user, the lower edge of the reflector disposed adjacent to a front surface of the user,
a first distance between the upper edge of the reflector and the front surface of the user is greater than a second distance between the lower edge of the reflector and the front surface of the user, the reflector being disposed between the user and the display device, the display device being spaced apart from the user by the reflector,
the display device includes the upper edge and a lower edge, the lower edge of the display device disposed at a lower height than the upper edge of the display device,
the upper edge of the display device contacts the upper edge of the reflector,
the lower edge of the display device extends outwardly away from the user and contacts the augmentation optical element, and
the augmentation optical element is disposed within the front viewing angle range of the user.

2. The AR device of claim 1, wherein the display device comprises a plastic organic light emitting diode.

3. The AR device of claim 2, wherein the display device supplies the entire augmented image to the reflector.

4. The AR device of claim 1, wherein
the reflector is disposed at a first angle with respect to the display device.

5. The AR device of claim 4, wherein the reflector is disposed at a second angle with respect to a horizontal axis.

6. The AR device of claim 4, wherein the upper edge of reflector is attached to the upper edge of display device by at least one of an adhesive or a fastener.

7. The AR device of claim 1, wherein the augmentation optical element comprises a polarized half-mirror which transmits the real image and reflects the augmented image.

8. The AR device of claim 7, wherein the augmentation optical element allows the real image and the augmented image to travel in a first direction which is a direction toward the front surface of the user.

9. The AR device of claim 8, wherein the augmentation optical element allows the real image and the augmented image to travel within the front viewing angle range of the user.

10. The AR device of claim 1, wherein the augmentation optical element comprises a transmittance controller that controls a transmittance of the real image.

11. The AR device of claim 10, wherein the transmittance controller comprises:
a liquid crystal cell that controls a light transmittance; and
a voltage supply that supplies a driving voltage to the liquid crystal cell.

12. The AR device of claim 1, wherein the augmentation optical element has curved surface facing an eye of the user when the AR device is worn by the user.

13. The AR device of claim 12 wherein a distance between the eye of the user and the curved surface of the augmentation optical element is substantially the same along the front viewing angle range of the user.

14. The AR device of claim 1 wherein the front viewing angle range of the user includes an upper viewing angle having an angle of about 35° above a horizontal axis and a lower viewing angle having an angle of about 15° below the horizontal axis.

15. The AR device of claim 1, wherein the augmentation optical element includes:
a liquid crystal cell having a variable transmittance;
a reflective polarizing film on a first side of the liquid crystal cell that faces the user, when the AR device is worn by the user, the reflective polarizing film configured to reflect the augmented image and to transmit the real image along a transmissive axis; and
an external polarizing film on a second side of the liquid crystal cell opposite the first side, the external polarizing film configured to polarize the real image to match the transmissive axis of the reflective polarizing film.

16. The AR device of claim 1, wherein the augmented image reflected by the reflector is overlapped with the real image at the augmentation optical element within the front viewing angle range of the user.

17. The AR device of claim 1, wherein the lower edge of the reflector is disposed on a line corresponding to an upper viewing angle of the user.

18. The AR device of claim 1, wherein a first surface of the display device and the reflective surface of the reflector form an acute angle, and
wherein the first surface of the display device and the augmentation optical element form an obtuse angle.

19. The AR device of claim 1, wherein the upper edge of the display device is in direct contact with the upper edge of the reflector.

20. The AR device of claim 1, wherein the upper edge of reflector is attached to the upper edge of display device by an adhesive.

21. An augmented reality (AR) device, comprising:
   a display device configured to display an augmented image toward a user, the display device facing a front surface of the user and being disposed within a front viewing angle range of the user, when the AR device is worn by the user, the display device including an upper edge and a lower edge, the lower edge of the display device disposed at a lower height than the upper edge of the display device;
   a reflector having an upper edge coupled to a first side of the display device and disposed between the user and the display device, when the AR device is worn by the user, the upper edge of the reflector extends outwardly away from the user and a lower edge of the reflector extends toward the user, a first distance between the upper edge of the reflector and the user is greater than a second distance between the lower edge of the reflector and the user, the reflector having a reflective surface that faces in a downward direction, the reflector configured to reflect the augmented image in the downward direction;
   an augmentation optical element coupled to a second side of the display device that is opposite the first side, the augmentation optical element configured to:
      receive the augmented image reflected by the reflector;
      receive a real image from an outside environment; and
      provide the augmented image and the real image to the user within the front viewing angle range of the user,
   wherein the upper edge of the display device contacts the upper edge of the reflector, and
   wherein the lower edge of the display device extends outwardly away from the user and contacts the augmentation optical element.

22. The AR device of claim 21, wherein the augmentation optical element includes:
   a liquid crystal cell having a variable transmittance;
   a reflective polarizing film on a first side of the liquid crystal cell that faces the user, when the AR device is worn by the user, the reflective polarizing film configured to reflect the augmented image and to transmit the real image along a transmissive axis; and
   an external polarizing film on a second side of the liquid crystal cell opposite the first side, the external polarizing film configured to polarize the real image to match the transmissive axis of the reflective polarizing film.

23. The AR device of claim 21, wherein the reflector is attached to the first side of the display device by at least one of an adhesive or a fastener.

24. The AR device of claim 21, wherein the augmentation optical element comprises a polarized half-mirror which transmits the real image and reflects the augmented image within the front viewing angle range of the user.

* * * * *

UNITED STATES PATENT AND TRADEMARK OFFICE
CERTIFICATE OF CORRECTION

PATENT NO. : 10,983,347 B2  
APPLICATION NO. : 15/848410  
DATED : April 20, 2021  
INVENTOR(S) : Kim et al.

Page 1 of 1

It is certified that error appears in the above-identified patent and that said Letters Patent is hereby corrected as shown below:

On the Title Page

Column 2, item (56) References Cited/Other Publications:
"Office Action dated Jul. 7, 2020 for Chines Application No. CN201711341088.3, pp. 15"
Should have read:
--Office Action dated Jul. 7, 2020 for Chinese Application No. CN201711341088.3, pp. 15.--

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*